United States Patent

Getts

[11] 4,318,224
[45] Mar. 9, 1982

[54] CUTTING TOOL WITH ADJUSTABLE DEPTH CONTROL FOOT

[76] Inventor: Sidney A. Getts, 1923 N. Church St., Rockford, Ill. 61103

[21] Appl. No.: 233,620

[22] Filed: Feb. 12, 1981

Related U.S. Application Data

[63] Continuation-in-part of Ser. No. 49,427, Jun. 18, 1979, Pat. No. 4,255,858.

[51] Int. Cl.³ .......................................... B27B 19/02
[52] U.S. Cl. ................................. 30/377; 144/136 C
[58] Field of Search ................ 30/392, 393, 394, 377, 30/273, 275; 144/136 C

[56] References Cited

U.S. PATENT DOCUMENTS

| | | | |
|---|---|---|---|
| 1,352,519 | 9/1920 | Laserson | 30/377 |
| 1,813,231 | 7/1931 | Crowe | 30/377 |
| 3,155,128 | 11/1964 | Godfrey | 30/394 X |
| 3,468,350 | 9/1969 | Logan | 30/377 |
| 3,496,972 | 2/1970 | Rees | 30/377 |
| 4,235,017 | 11/1980 | Yavis | 30/377 |

Primary Examiner—Jimmy C. Peters
Attorney, Agent, or Firm—Leydig, Voit, Osann, Mayer & Holt

[57] ABSTRACT

The depth of cut of the blade of a plunge cut jig saw is selectively established by an adjustable depth control foot which keeps the selected depth of cut constant during the sawing operation.

8 Claims, 5 Drawing Figures

CUTTING TOOL WITH ADJUSTABLE DEPTH CONTROL FOOT

CROSS-REFERENCE TO A RELATED APPLICATION

This application is a continuation-in-part of my copending application Ser. No. 49,427, filed June 18, 1979 and entitled Jig Saw with Orbitally Movable Blade, now U.S. Pat. No. 4,255,858, granted Mar. 17, 1981.

BACKGROUND OF THE INVENTION

This invention relates to a tool having a power driven cutting device adapted to penetrate a workpiece. More particularly, the invention relates to a tool such as a portable jig saw having a blade which is capable of being plunged into the workpiece and thereafter moved along the workpiece to cut a groove or the like in the workpiece. In order to form the groove properly, it is important that the blade be held at a constant selected depth in the workpiece during the cutting action.

SUMMARY OF THE INVENTION

The general aim of the present invention is to provide a new and improved tool having a unique depth control foot which enables the cutting device to penetrate the workpiece to various selected depths and which holds the cutting device uniformly at the selected depth during operation of the cutting device.

A further object is to provide a tool in which the depth control foot is adapted to automatically latch the cutting device at a selected depth once the cutting device has reached that depth.

Still another object is to provide a tool in which the depth control foot and the cutting device are automatically unlatched as an incident to de-energization of the tool.

The invention also resides in the provision of a tool having an adjustable depth control foot with a novel latch and with novel mechanism for operating the latch.

These and other objects and advantages of the invention will become more apparent from the following detailed description when taken in conjunction with the accompanying drawings.

DETAILED DESCRIPTION OF THE PREFERRED EMBODIMENT

Figure 2:
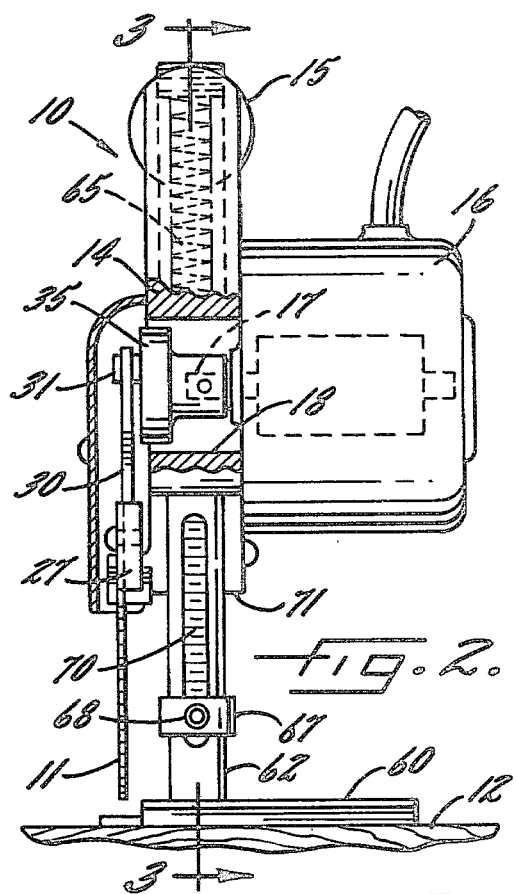
FIG. 2 is a front elevational view, partly in cross-section, of the tool shown in FIG. 1.

As shown in the drawings for purposes of illustration, the invention is embodied in a portable tool 10 having a power operated cutting device 11. In this particular instance, the tool is a saber saw or jig saw having a cutting device in the form of an elongated blade adapted to be moved back and forth lengthwise at high speeds to cut a workpiece 12. The saw 10 includes a main support or frame plate 14 connected rigidly to a handle 15 which may be used to hold the saw. An electric motor 16 is attached to one side of the frame plate 14 and includes a rotary shaft 17 (FIG. 2) which projects into an opening 18 in the frame plate.

By squeezing upwardly on an actuator or trigger 20 (FIG. 1) which is associated with the handle 15, the motor 16 may be energized to rotate the shaft 17 at relatively high speed (e.g., 10,000 RPM) and in a clockwise direction. The trigger is slidably mounted within the handle and is urged downwardly by a contractile spring 21 (FIG. 3) which is stretched between a lug 22 on the trigger and a lug 23 on the frame plate 14. A switch 24 (shown schematically in FIG. 3) is adapted to be closed by the ear 22 or some other part of the trigger when the latter is squeezed upwardly and, when closed, the switch causes the motor to be energized. When the trigger is released and pulled downwardly by the spring 21, the switch opens and de-energizes the motor.

The blade 11 is made of metal and is located in an upright position near the lower forward corner of the frame plate 14. Teeth 25 (FIG. 1) are formed along the forward edge of the blade and are raked so as to cut on the upstroke of the blade. Additional teeth 26 also are formed around the convexly curved tip of the blade and are raked in a forward sense. As explained in the above-identified application, the teeth 26 enable the blade 11 to be plunged downwardly into the workpiece 12 from the upper surface thereof.

Figure 1:
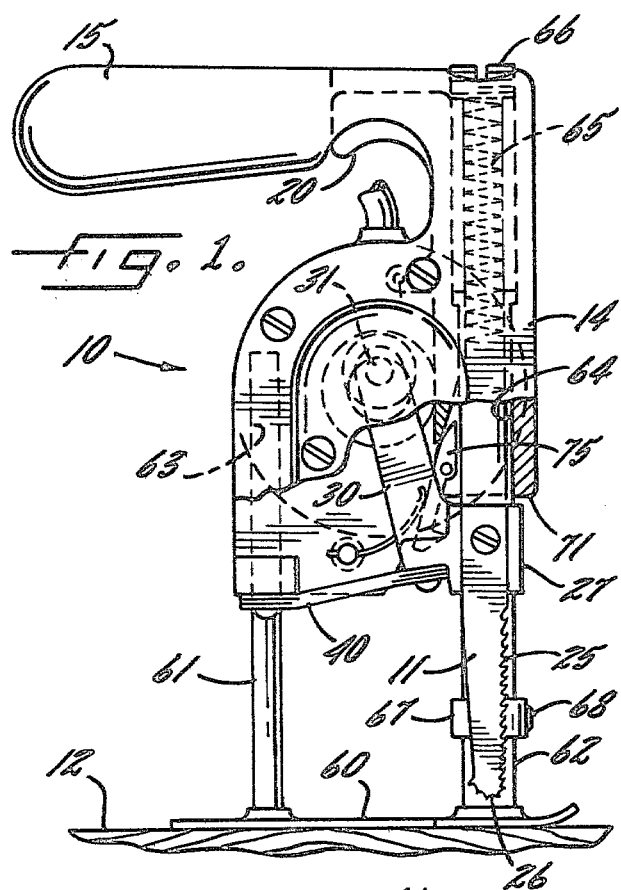
FIG. 1 is a side elevational view of a new and improved power tool incorporating the unique features of the present invention, parts of the tool being broken away and shown in section.

As shown in FIG. 1, the blade 11 extends downwardly from and is secured detachably to a holder 27. The holder is formed with an arm 30 which extends upwardly and rearwardly with respect to the upper end of the blade 11 adjacent the rear edge thereof. At its upper end portion, the arm 30 is connected to a pin 31 which is eccentrically mounted on a flywheel 35 attached securely to the shaft 17 of the motor 16. As the shaft rotates, the eccentric pin causes the holder 27 and the blade 11 to move upwardly and downwardly.

In the present saw 10, the blade 11 is not merely reciprocated with a straight up and down motion but instead is caused to move in a substantially elliptical orbit by a stack 40 of resiliently yieldable leaf springs which are connected between the frame plate 14 and the holder 27. When the holder is moved upwardly and downwardly by the eccentric pin 31, the leaf springs constrain the holder and cause the holder to oscillate forwardly and rearwardly so that the blade undertakes a substantially elliptical motion as described in the aforementioned application. The orbital motion enables the teeth 26 on the tip of the blade 11 to be effectively plunged downwardly into the workpiece 12. Thereafter, the saw 10 may be moved horizontally relative to the workpiece. Thus, grooves of various shapes can be formed in the workpiece.

To properly form a groove in the workpiece 12, it is necessary that the blade 11 be plunged downwardly into the workpiece to a preselected depth and then be held uniformly at that depth as the blade is moved horizontally relative to the workpiece. In accordance with the present invention, the saw 10 is equipped with a unique depth control foot 60 which automatically stops the blade after the blade has been plunged to a selected depth and which then holds the blade at the selected depth during the sawing operation.

Herein, the depth control foot 60 is in the form of a generally horizontal plate located beneath the frame plate 14. The foot 60 is located at the lower ends of a pair of posts 61 and 62 (FIG. 1) which are guided for up and down sliding within a pair of openings 63 and 64, respectively, in the frame plate 14. The post 62 is tubular and receives a coil spring 65 which is compressed between the lower end of the post 62 and a threaded plug 66 at the upper end of the opening 64. Thus, the posts and the openings support the frame plate and the blade for movement toward and away from the foot while the spring 65 urges the frame plate upwardly away from the foot.

A stop or collar 67 is telescoped over the lower end portion of the post 62 and is adjustably secured to that post by a screw 68. The collar 67 is located beneath the frame plate 14. To establish the depth of cut, the collar 67 is adjusted to a desired vertical position along the post 62 and then is secured in that position by the screw 68. A calibrated scale 70 (FIG. 2) may be formed on the post 62 to facilitate positioning of the collar 67. Once the collar 67 has been secured in the desired position, the frame plate 14 is manually pushed downwardly and the blade 11 plunges into the workpiece 12 until the lower end 71 of the frame plate contacts and is stopped by the collar (see FIG. 4). Such stopping establishes the depth of cut of the blade.

In carrying out the invention, means are provided for holding the blade 11 uniformly at the selected depth after the blade has been plunged into the workpiece 12 and as the blade is moved horizontally along the workpiece. In the present instance, these means comprise a latch 75 which is mounted on the frame plate 14 to move between latched and unlatched positions and which is adapted to engage the collar 67 to prevent the frame plate from moving upwardly away from the foot 60 under the urging of the spring 65.

Figure 3:
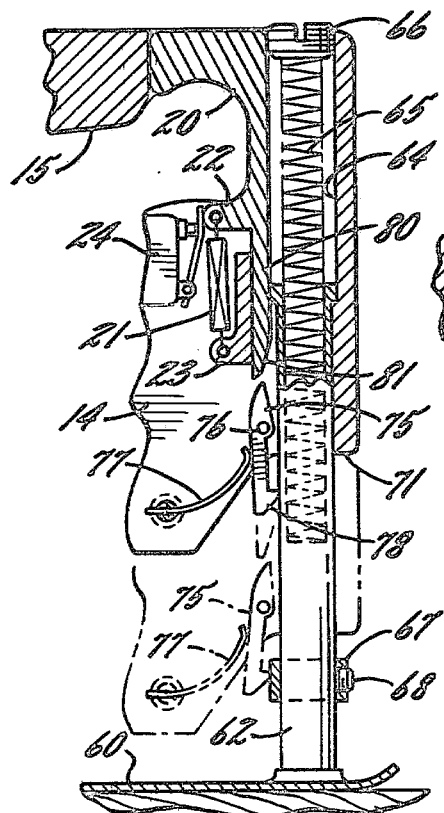
FIG. 3 is a fragmentary cross-section taken substantially along the line 3—3 of FIG. 2.
Figure 4:
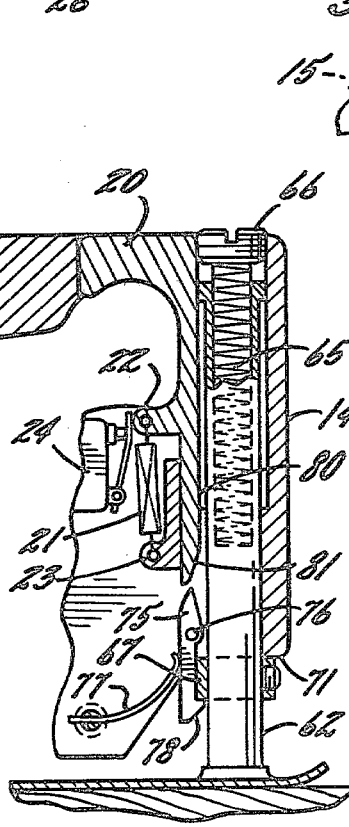
FIGS. 4 and 5 are views similar to FIG. 3 but show the tool in successively moved positions which occur during a cutting operation.

As shown in FIG. 3, the latch 75 is in the form of a finger-like element which is pivotally mounted intermediate its ends on a horizontal pin 76 secured to the frame plate 14. A leaf spring 77 is cantilevered on the frame plate and bears against the latch to urge the latch counterclockwise about the pin to its latched position (FIG. 4). The lower end portion of the latch is formed with a hook 78 adapted to catch beneath the collar 67.

In the preferred embodiment of the invention, the latch 75 is normally held in its unlatched position by the trigger 20 and is released for movement to its latched position when the trigger is squeezed to energize the motor 16. When the trigger is released to de-energize the motor, the latch is moved to its unlatched position to release the frame plate 14 from the foot 60.

To achieve the foregoing, a depending finger 80 (FIG. 3) is integral with the trigger 20 and is formed with an inclined cam surface 81 which is adapted to engage the upper end portion of the latch 75. When the trigger is released and is urged downwardly by the spring 21, the inclined surface 81 of the finger 80 cams against the upper end portion of the latch 75 and swings the latch clockwise about the pin 76 to its unlatched position shown in FIGS. 1 and 5. When the latch is in its unlatched position, the hook 78 is spaced away from the post 62 and the collar 67. Upon squeezing of the trigger, the finger 80 moves upwardly away from the latch 75 to permit the spring 77 to swing the latch counterclockwise until the hook 78 engages the post 62 (see FIG. 3).

To use the saw 10, the collar 67 is adjusted on the post 62 to establish the desired depth of cut. The saw then is positioned as shown in FIG. 1 with the foot 60 resting on the workpiece 12. When the trigger 20 is squeezed to start the motor 16, the finger 80 is lifted upwardly to permit the latch 75 to swing from its unlatched position shown in FIG. 1 to the solid line position shown in FIG. 3 in which the hook 78 engages the post 62 and is spaced above the collar 67.

The frame plate 14 then is pushed downwardly on the posts 61 and 62 to plunge the blade 11 into the workpiece 12. As the frame plate moves downwardly, an inclined surface on the hook 78 engages the upper end of the collar 67 to cam the latch 75 clockwise and thereby cause the hook to engage the side of the collar as shown in phantom lines in FIG. 3.

When the frame plate 14 has been pushed downwardly sufficiently far to plunge the blade 11 to the selected depth, the lower end 71 of the frame plate engages the upper end of the collar 67 to stop further downward movement of the frame plate and the blade. At the same time, the hook 68 moves below the collar and thus the spring 77 turns the latch counterclockwise to its latched position (FIG. 4) to cause the hook 78 to catch beneath the collar. Accordingly, the hook prevents the blade 11 and the frame plate 14 from moving upwardly relative to the foot 60 under the urging of the spring 65. Thus, the blade 11 is prevented from moving either upwardly or downwardly relative to the foot 60 and hence is moved along the workpiece 12.

Figure 5:
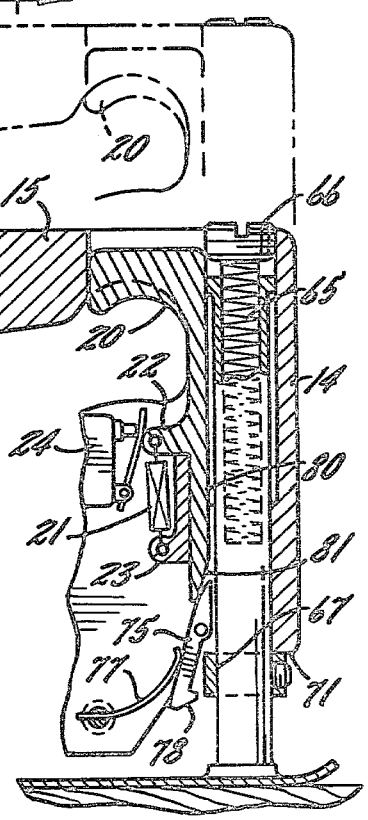

When the trigger 20 is released to stop the motor 16, the finger 80 cams the latch 75 to its unlatched position as shown in FIG. 5. As a result, the spring 65 will shift the blade 11 and the frame plate 14 upwardly relative to the foot 60 once manual downward pressure has been released from the handle 15. The saw 10 then can be re-positioned along the workpiece 12 to make another cut.

From the foregoing, it will be apparent that the present invention brings to the art a saw 10 with a new and improved depth control foot 60 which may be adjusted to establish a selected depth of cut and which keeps that depth constant during the sawing operation. It will be appreciated that the latch 75 could be released manually by means other than the trigger 20.

I claim:

1. A tool having a support, an elongated cutting device, means on said support and connected to said cutting device for driving the latter, a foot located adjacent said cutting device for controlling the depth of penetration of the cutting device into a workpiece, means mounting said support on said foot to move toward and away from the foot, resiliently yieldable means urging said support away from said foot, adjustable means for stopping said support in different selected positions when said support is moved toward said foot, and a latch acting between said support and said foot and movable to a latched position holding said support in a selected position and preventing said support from moving away from said foot under the urging of said resiliently yieldable means, said latch being selectively movable to an unlatched position permitting said support to move away from said foot.

2. A saw as defined in claim 1 further including means mounting said latch on said support to move between said latched and unlatched positions, and means for automatically moving said latch to said latched position when support is moved toward said foot and reaches a selected position.

3. A saw having a support, an elongated blade, an electric motor on said support and connected to said blade for moving the blade back and forth generally lengthwise of the blade, a foot located adjacent said blade for controlling the depth of cut of the blade into a workpiece, means mounting said support on said foot to move toward and away from the foot, resiliently yieldable means urging the support away from the foot, a stop on said foot and selectively adjustable toward and away from the foot, means for securing said stop on said foot at a predetermined position relative to the foot, said support engaging said stop and being stopped in a selected position by the stop when said support is moved toward said foot, a latch mounted on said support to move between latched and unlatched positions, means biasing said latch toward said latched position, said stop engaging said latch and camming said latch toward said unlatched position against the action of said biasing means as said support is moved toward said foot, said biasing means thereafter automatically moving said latch to said latched position, said latch engaging said stop when said support is in its selected position and when said latch is in said latched position and being operable to hold said support in its selected position and to prevent said support from moving away from said foot under the urging of said resiliently yieldable means, and manually operable means for moving said latch to said unlatched position and out of engagement with said stop thereby to permit said support to move away from said foot.

4. A saw as defined in claim 3 in which said mounting means comprise a post secured to said foot and slidably connected to said support, said stop comprising a collar telescoped over and adjustable along said post.

5. A saw as defined in claim 3 in which said latch is pivotally mounted on said support to swing between said latched and unlatched positions, said biasing means comprising a spring mounted on said support and urging said latch to said latched position.

6. A saw as defined in claim 3 in which said manually operable means comprise an actuator movable relative to said support, means on said actuator for engaging said latch and moving said latch to said unlatched position when said actuator is moved in one direction relative to said support, and means for urging said actuator in said one direction relative to said support.

7. A saw as defined in claim 6 further including means associated with said actuator and operable to de-energize said motor when said actuator is moved in said one direction relative to said support.

8. A saw having a support, an elongated blade, an electric motor mounted on said support and connected to said blade for moving the blade back and forth generally lengthwise of the blade, a foot located adjacent said blade for controlling the depth of cut of the blade into a workpiece, means mounting said support on said foot to move toward and away from the foot, resiliently yieldable means urging the support away from the foot, adjustable means for stopping said support in different selected positions when said support is moved toward said foot, a latch mounted on said support to move between latched and unlatched positions, means for automatically moving said latch to said latched position when said support is moved toward said foot and reaches a selected position, said latch being operable when in said latched position to hold said support in said selected position and to prevent said support from moving away from said foot under the urging of said resiliently yieldable means, an actuator mounted on and movable relative to said support, said actuator being operable when moved in one direction relative to said support to de-energize said motor, and means connected to said actuator and operable to cause said latch to move to said unlatched position when said actuator is moved in said one direction relative to said support, said latch being operable when in said unlatched position to permit said support to move away from said foot.

* * * * *